(12) United States Patent
Yang et al.

(10) Patent No.: US 7,923,957 B2
(45) Date of Patent: Apr. 12, 2011

(54) CONTROL SYSTEM AND METHOD FOR MOTOR DRIVERS

(75) Inventors: Chia-Jung Yang, Taipei Hsien (TW); Fei-Hsu Chen, Taipei Hsien (TW)

(73) Assignee: Foxnum Technology Co., Ltd., Tu-Cheng, New Taipei (TW)

( * ) Notice: Subject to any disclaimer, the term of this patent is extended or adjusted under 35 U.S.C. 154(b) by 385 days.

(21) Appl. No.: 12/252,364

(22) Filed: Oct. 16, 2008

(65) Prior Publication Data

US 2009/0309533 A1 Dec. 17, 2009

(30) Foreign Application Priority Data

Jun. 16, 2008 (CN) .......................... 2008 1 0302154

(51) Int. Cl.
*G05B 19/404* (2006.01)
(52) U.S. Cl. .................... 318/632; 318/111; 318/113
(58) Field of Classification Search .................. 318/632, 318/34, 81, 111, 113
See application file for complete search history.

(56) References Cited

U.S. PATENT DOCUMENTS

| | | | | |
|---|---|---|---|---|
| 4,259,621 A * | 3/1981 | Jakobsen et al. | ................. | 318/85 |
| 4,289,997 A * | 9/1981 | Jung et al. | ..................... | 318/113 |
| 4,825,133 A * | 4/1989 | Tanuma et al. | ................ | 318/113 |
| 5,136,222 A * | 8/1992 | Yamamoto et al. | ......... | 318/568.2 |
| 5,361,260 A * | 11/1994 | Mito | ............................. | 370/452 |
| 5,990,638 A * | 11/1999 | Aoyama et al. | .................. | 318/85 |
| 6,348,774 B1 * | 2/2002 | Andresen et al. | ............. | 318/685 |
| 6,442,444 B2 * | 8/2002 | Matsubara et al. | ............ | 700/95 |
| 6,522,096 B1 * | 2/2003 | Roth | ......................... | 310/156.01 |
| 6,653,810 B2 * | 11/2003 | Lo | .................................. | 318/569 |
| 6,686,712 B2 * | 2/2004 | Numaguchi et al. | ............ | 318/34 |
| 6,791,294 B1 * | 9/2004 | Kazama et al. | ................ | 318/677 |
| 6,792,330 B1 * | 9/2004 | Matsumoto et al. | .......... | 700/193 |
| 6,806,660 B2 * | 10/2004 | Fujisaki et al. | ................ | 318/113 |
| 6,814,546 B2 * | 11/2004 | Sekiguchi | ......................... | 417/3 |
| 6,933,698 B2 * | 8/2005 | Miura et al. | ................... | 318/625 |
| 7,000,125 B2 * | 2/2006 | Chapuis et al. | ................ | 713/300 |
| 7,024,257 B2 * | 4/2006 | Pearce et al. | ..................... | 700/72 |
| 7,073,022 B2 * | 7/2006 | El-Batal et al. | ................ | 711/114 |
| 7,119,505 B2 * | 10/2006 | Komaki et al. | ................. | 318/113 |
| 7,143,202 B2 * | 11/2006 | Tehrani et al. | ................... | 710/15 |
| 7,456,617 B2 * | 11/2008 | Chapuis et al. | ................ | 323/267 |
| 2002/0049505 A1 * | 4/2002 | Heinemann et al. | ............ | 700/22 |
| 2002/0093303 A1 * | 7/2002 | Lo | .................................. | 318/569 |
| 2002/0110155 A1 * | 8/2002 | Pearce et al. | ................... | 370/519 |
| 2003/0005188 A1 * | 1/2003 | Tehrani et al. | ................... | 710/15 |
| 2003/0085674 A1 * | 5/2003 | Numaguchi et al. | ............ | 318/34 |
| 2003/0128007 A1 * | 7/2003 | Fujisaki et al. | ................ | 318/560 |
| 2004/0160206 A1 * | 8/2004 | Komaki et al. | ................. | 318/569 |
| 2004/0178761 A1 * | 9/2004 | Miura et al. | ................... | 318/625 |
| 2005/0289373 A1 * | 12/2005 | Chapuis et al. | ................ | 713/300 |
| 2006/0271805 A1 * | 11/2006 | Pearce et al. | ................... | 713/401 |

* cited by examiner

*Primary Examiner* — Paul Ip
(74) *Attorney, Agent, or Firm* — Zhigang Ma

(57) ABSTRACT

A control method for motor driver includes: outputting a first signal from the controller to the first motor driver; making the first timer start to count for a first time; returning a first feedback signal from the first motor driver to the controller; dividing a value of a first count time of the first timer by two to get a value of a first delay time, wherein the first delay time is defined as the time of transmitting signals from the controller to the first motor driver; adding the value of the first delay time to the value of the first count time of the first timer to get a first sum; and transferring the first sum to the second timer to replace a value of a count time of the second timer.

9 Claims, 5 Drawing Sheets

CONTROL SYSTEM AND METHOD FOR MOTOR DRIVERS

BACKGROUND

1. Technical Field

Embodiments of the present disclosure relate to a control system and method for motor drivers.

2. Description of the Related Art

In computer numerical control systems, a controller controls a plurality of motor drivers which are at different distances from the controller, which causes timing problems. In other words because of the different distances, a command to control some action of the plurality of motor drivers will not be received by the motor drivers at the same time. As a result, errors may occur in computer numerical control systems.

Therefore, what is needed, is a control system and method for motor drivers which can solve the above problem.

DETAILED DESCRIPTION

Figure 1:
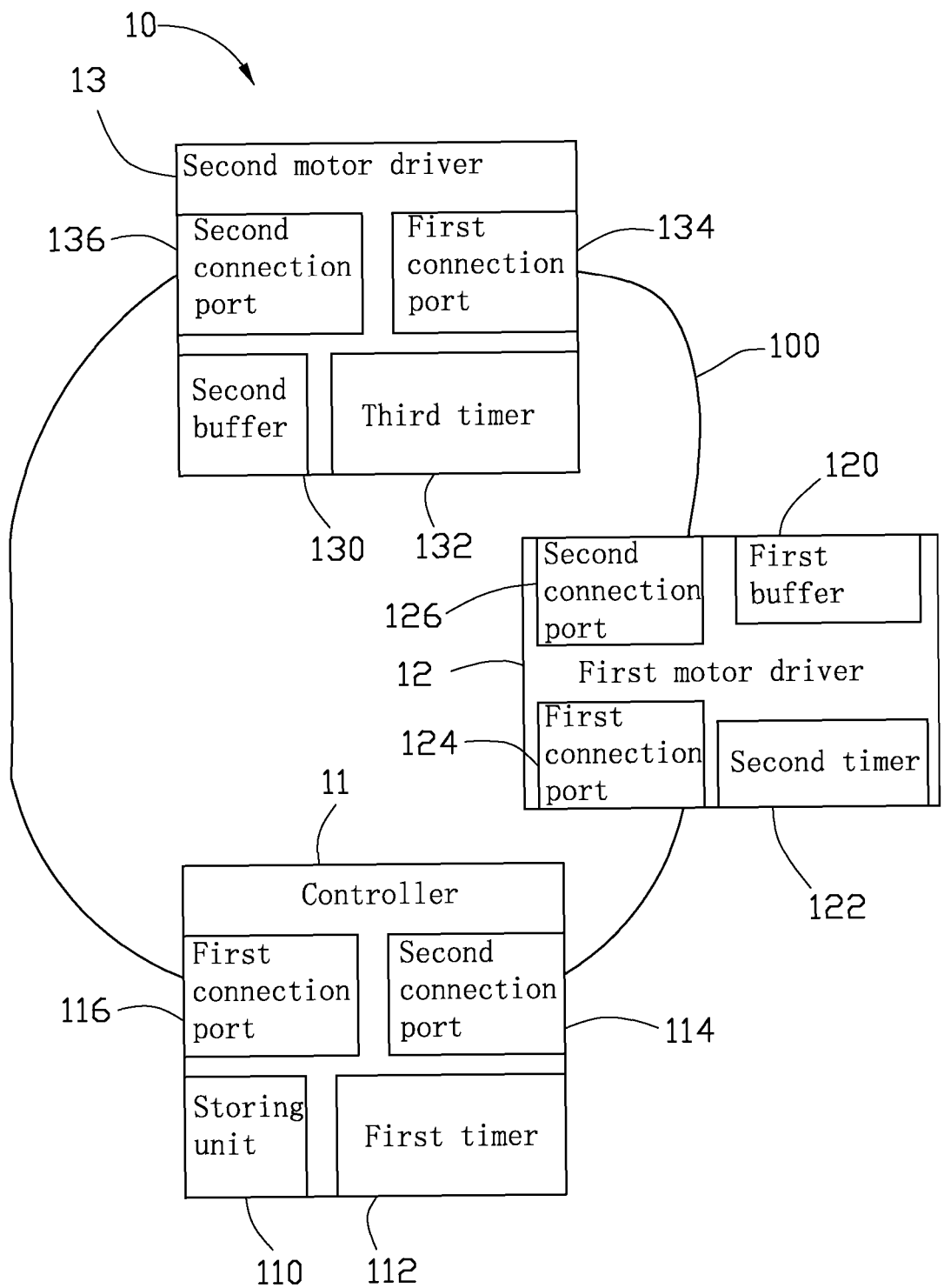
FIG. 1 is a block diagram of an embodiment of a control system for motor drivers, the control system including a controller, a first motor driver, and a second motor driver.

Referring to FIG. 1, an embodiment of a control system 10 includes a controller 11, a first motor driver 12, and a second motor driver 13. The controller 11 includes a storing unit 110, a first timer 112, a first connection port 116, and a second connection port 114. The first motor driver 12 includes a first buffer 120, a second timer 122, a first connection port 124, and a second connection port 126. The second motor driver 13 includes a second buffer 130, a third timer 132, a first connection port 134, and a second connection port 136.

The controller 11, the first motor driver 12, and the second motor driver 13 communicate with each other via the first and second connection ports.

In the current embodiment, t1 is defined as a first start time for the first timer 112, t2 is defined as a first stop time for the first timer 112, t3 is defined as a second start time for the first timer 112, and t4 is defined as a second stop time for the first timer 112. A_time is defined as an elapsed time between the first start time t1 and the first stop time t2 of the first timer 112. B_time is defined as an elapsed time between the second start time t3 and the second stop time t4 of the first timer 112. C_time is defined as an elapsed time between a first start time and a first stop time of the second timer 122. D_time is defined as an elapsed time between a first start time and a first stop time of the third timer 132.

T1 is defined as a first delay time of transmitting signals from the controller 11 to the first motor driver 12. T2 is defined as a second delay time of transmitting signals from the first motor driver 12 to the second motor driver 13. The sum of T1 and T2 is defined as a third delay time of transmitting signals from the controller 10 to the second motor driver 13. The value of A_time is two times the value of the first delay time T1. The value of B_time is two times the value of the third delay time (T1+T2).

Figure 2:
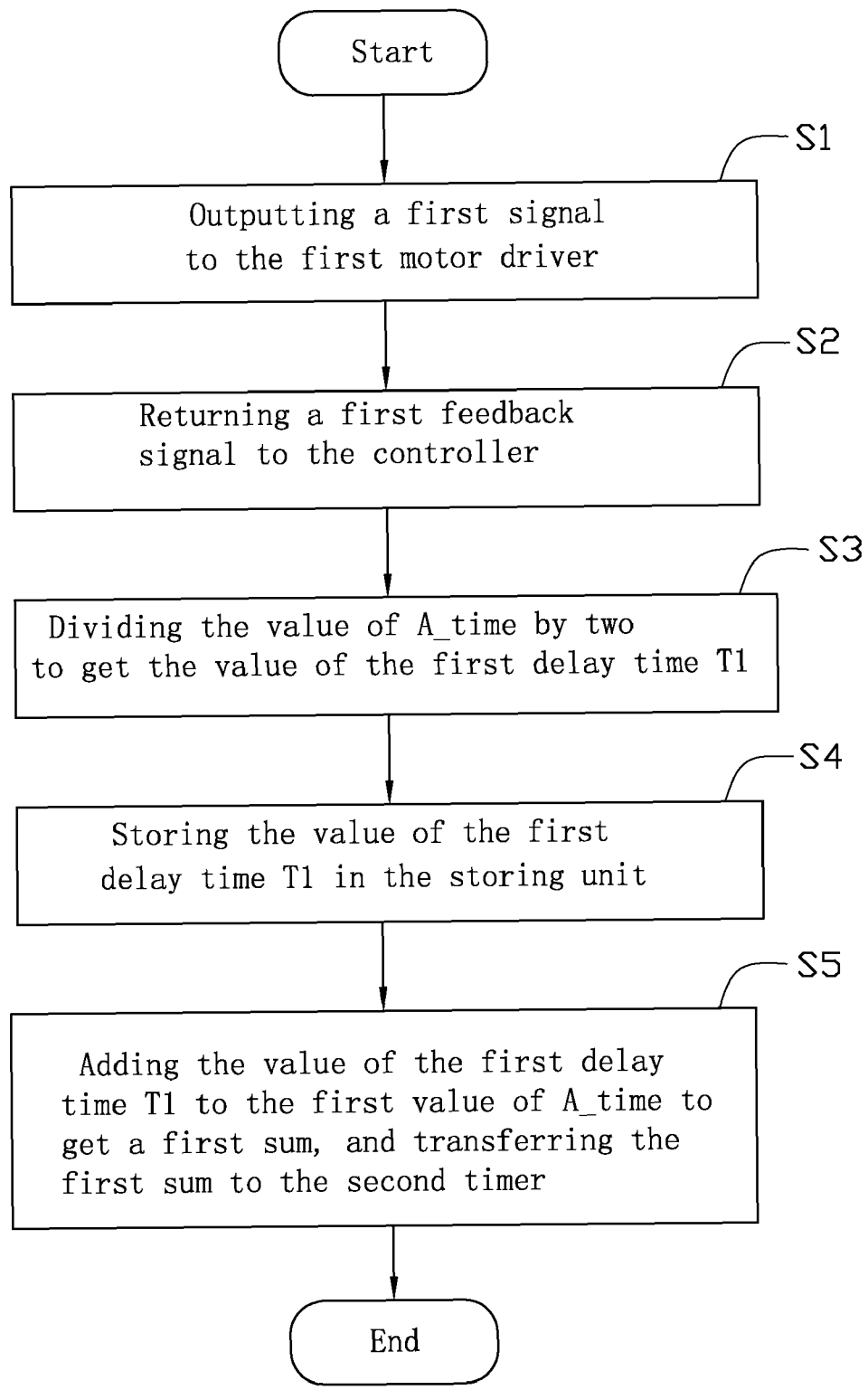
FIG. 2 is a flowchart of an embodiment of a control method for controlling the first motor driver.

FIG. 2 is a flowchart of a first control method for controlling the first motor driver 12. Depending on the embodiment, additional blocks may be added, others deleted, and the ordering of the blocks may be changed.

In block S1, the controller 11 outputs a first signal to the first motor driver 12, and the first timer 112 of the controller 11 starts to time for the first time at the first start time t1.

In block S2, the second timer 122 of the first motor driver 12 returns a first feedback signal to the controller 11 when it receives the first signal from the controller 11. At the same time, the first timer 112 stops timing at t2.

In block S3, the controller 11 divides the value of A_time of the first timer 112 by two to get the value of the first delay time T1.

In block S4, the value of the first delay time T1 is stored in the storing unit 110 of the controller 11.

In block S5, the controller 11 adds the value of the first delay time T1 to the value of A_time of the first timer 112 to get a first sum (T1+A_time), and transfers the first sum (T1+A_time) to the second timer 122. Therefore, a value of C_time of the second timer 122 is equal to the first sum (T1+A_time). As a result, the controller 11 can start the first motor driver 12 precisely at a desired time.

Figure 3:
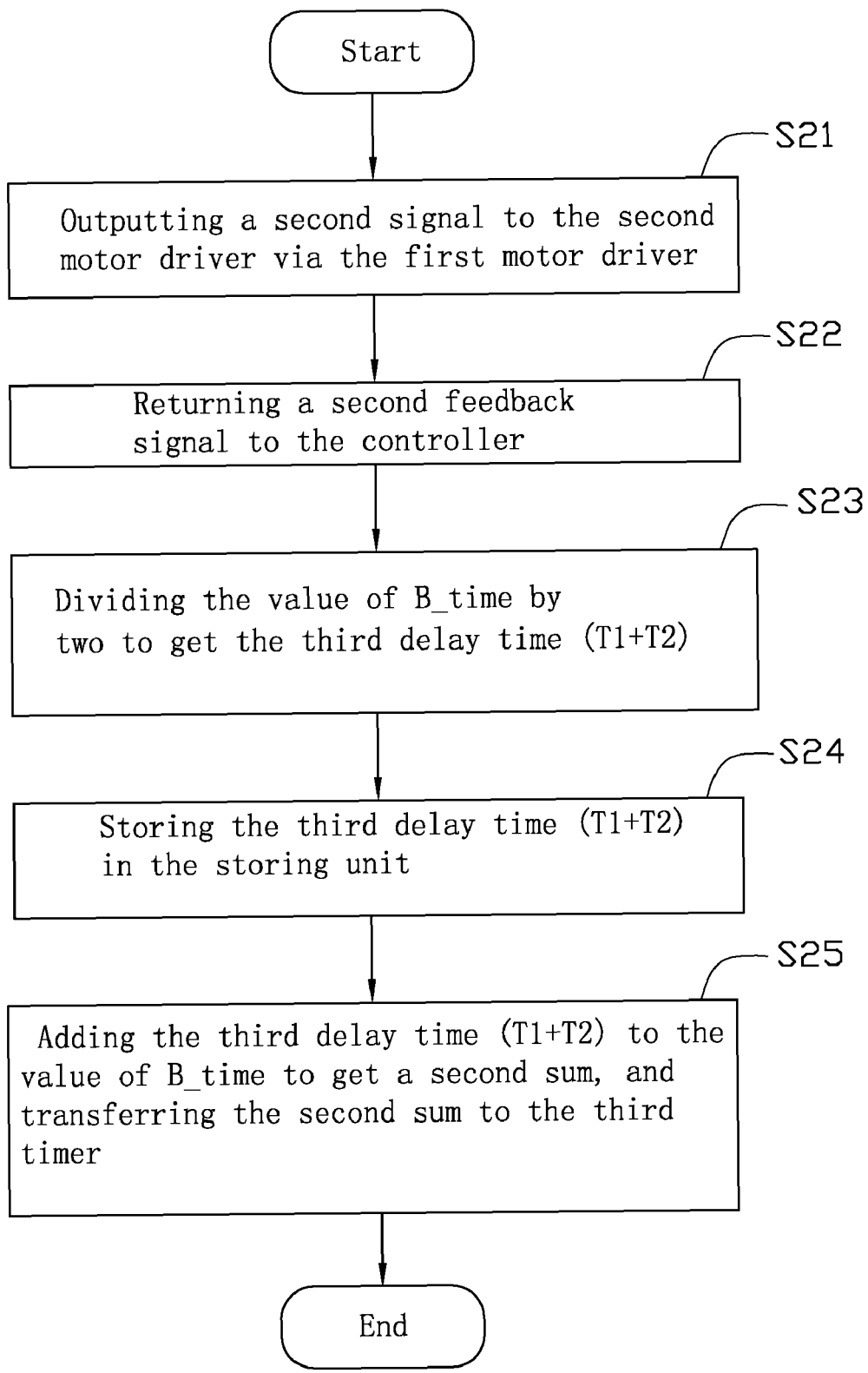
FIG. 3 is a flowchart of an embodiment of a control method for controlling the second motor driver.

FIG. 3 is a flowchart of a control method for starting the second motor driver 13. Depending on the embodiment, additional blocks may be added, others deleted, and the ordering of the blocks may be changed.

In block S21, the controller 10 outputs a second signal to the second motor driver 13 via the first motor driver 12, and the first timer 112 starts to time for the second time from the second start time t3.

In block S22, the third timer 132 of the second motor driver 13 returns a second feedback signal to the controller 11 when it receives the second signal from the controller 11. At the same time, the first timer 112 stops timing at time t4.

In block S23, the controller 11 divides the value of B_time of the first timer 112 by two to get the value of the third delay time (T1+T2).

In block S24, the value of the third delay time (T1+T2) is stored in the storing unit 110 of the controller 11.

In block S25, the controller 11 adds the value of the third delay time (T1+T2) to the value of B_time of the first timer 112 to get a second sum (T1+T2+B_time), and transfers the second sum (T1+T2+B_time) to the third timer 132. Therefore, a value of D_time of the third timer 132 is equal to the second sum (T1+T2+B_time). As a result, the controller 11 can start the second motor driver 13 precisely at a desired time.

Figure 4:
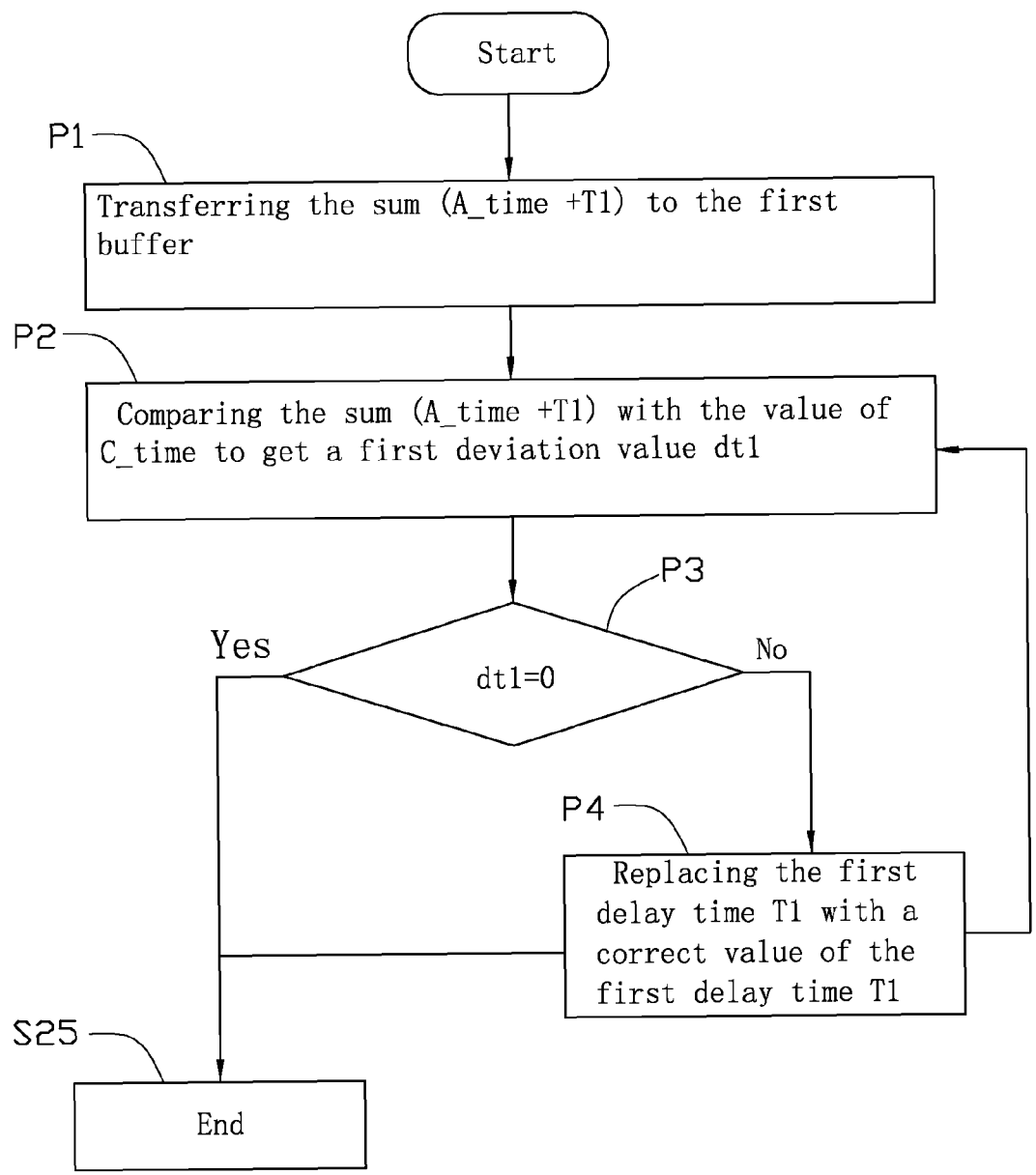
FIG. 4 is a flowchart of an embodiment of a method for regulating a first delay time of FIG. 2.

FIG. 4 is a flowchart of a method for regulating the first delay time of FIG. 2. Depending on the embodiment, additional blocks may be added, others deleted, and the ordering of the blocks may be changed.

In block P1, the controller 11 transfers the first sum (T1+A_time) to the first buffer 120 of the first motor driver 12.

In block P2, the controller 11 compares the first sum (T1+A_time) with the value of C_time of the second timer 122 to get a first deviation value dt1.

In block P3, the controller 11 determines whether the first deviation value dt1 is equal to 0. If the first deviation value dt2 is equal to 0, the first delay time T1 does not need to be regulated.

In block P4, if the first deviation value dt1 is not equal to 0, the controller 11 replaces the value of the first delay time T1 with a correct value of the first delay time T1. The correct value of the first delay time T1 is equal to the sum of the original value of the first delay time T1 and the first deviation value dt1.

Figure 5:
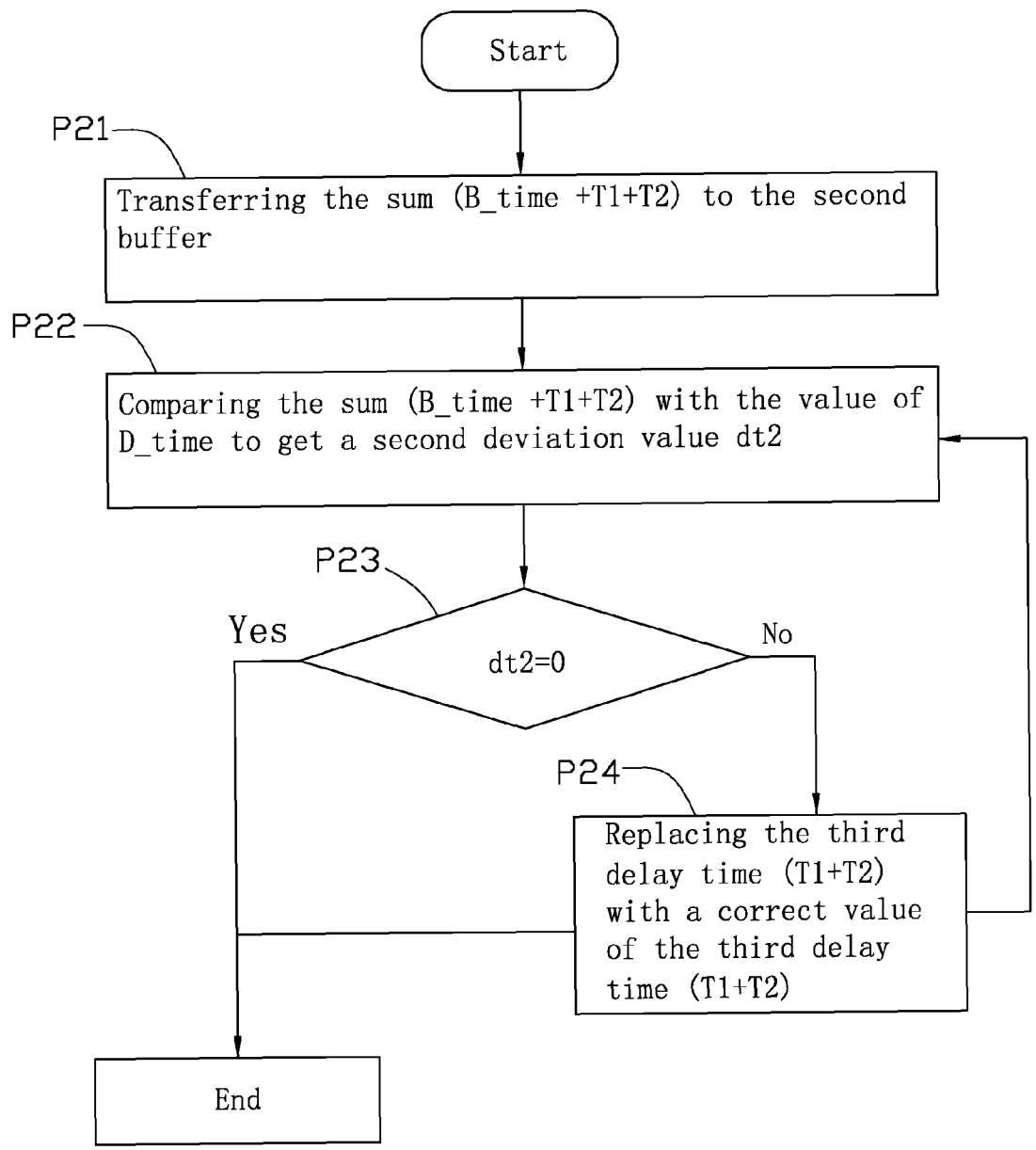
FIG. 5 is a flowchart of an embodiment of a method for regulating a third delay time of FIG. 3.

FIG. 5 is a flowchart of a method for regulating the third delay time of FIG. 3. Depending on the embodiment, additional blocks may be added, others deleted, and the ordering of the blocks may be changed.

In block P21, the controller 11 transfers the second sum (T1+T2+B_time) to the second buffer 130 of the second motor driver 13.

In block P22, the controller 1 compares the second sum (T1+T2+B_time) with the value of D_time of the third timer 132 to get a second deviation value dt2.

In block P23, the controller 11 determines whether the second deviation value dt2 is equal to 0. If the second deviation value dt2 is equal to 0, the third delay time (T1+T2) does not need to be regulated.

In block P24, if the second deviation value dt2 is not equal to 0, the controller 11 replaces the third delay time (T1+T2) with a correct value of the third delay time (T1+T2). The correct value of the third delay time (T1+T2) is equal to the sum of the original value of the third delay time (T1+T2) and the second deviation value dt2.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternately embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A motor control method comprising:
    providing:
        a controller comprising a first timer; and
        a first motor driver comprising a second timer;
    outputting a first signal from the controller to the first motor driver;
    making the first timer start to count for a first time;
    returning a first feedback signal from the first motor driver to the controller and stopping the first timer;
    dividing a value of a first count time of the first timer by two to get a value of a first delay time, wherein the first delay time is defined as the time of transmitting signals from the controller to the first motor driver;
    adding the value of the first delay time to the value of the first count time of the first timer to get a first sum; and
    transferring the first sum to the second timer to replace a value of a count time of the second timer.

2. The motor control method as claimed in claim 1, further comprising:
    providing a first buffer to the first motor driver for storing the value of the first sum; and
    regulating the first delay time by the controller and the first buffer of the first motor driver.

3. The motor control method as claimed in claim 2, wherein the step "regulating the first delay time" comprising:
    adding the value of the first count time of the first timer to the value of the first delay time;
    comparing the sum of the first value of the first count time of the first timer and the value of the first delay time with the value of the count time of the second timer to get a first deviation value;
    determining whether the first deviation value is equal to zero, upon the condition that the first deviation value is equal to zero, the first delay time does not need to be regulated;
    upon the condition that the first deviation value is not equal to zero, the controller replaces the value of the first delay time with a correct value of the first delay time, wherein the correct value of the first delay time is equal to a sum of the value of the first delay time and the first deviation value.

4. The motor control method as claimed in claim 1, further comprising:
    providing a second motor driver comprising a third timer;
    outputting a second signal from the controller to the second motor driver via the first motor driver;
    making the first timer start to count for a second time;
    returning a second feedback signal from the second motor driver to the controller and stopping the first timer;
    adding the first delay time to a second delay time to get a third delay time, wherein the second delay time is defined as the time of transmitting signals from the first motor driver to the second motor driver, the third delay time is defined as the time of transmitting signals from the controller to the second motor driver;
    dividing a value of a second count time of the first timer by two to get a value of the third delay time;
    adding the value of the third delay time to the value of the second count time of the first timer to get a second sum; and
    transferring the second sum to the third timer to replace a value of a count time of the third timer.

5. The motor control method as claimed in claim 4, further comprising:
    providing a second buffer to the second motor driver for storing the value of the second sum; and
    regulating the third delay time by the controller and the second buffer of the second motor driver.

6. The motor control method as claimed in claim 5, wherein the step "regulating the third delay time" comprising:
    adding the value of the second count time of the first timer to the value of the third delay time;
    comparing the sum of the value of the second count time of the first timer and the value of the third delay time with the value of the count time of the third timer to get a second deviation value;
    determining whether the second deviation is equal to zero, upon the condition that the second deviation value is equal to zero, the third delay time does not need to be regulated;
    upon the condition that the second deviation is not equal to zero, the controller replaces the value of the third delay time with a correct value of the third delay time, wherein the correct value of the third delay time is equal to a sum of the value of the third delay time and the second deviation value.

7. A motor control system comprising:
    a controller comprising a first timer;
    a first motor driver comprising a second timer;
    wherein the controller is capable of outputting a first signal to the first motor driver to make the first timer start to count for a first time; wherein the first motor driver is capable of returning a first feedback signal from the first motor driver to the controller as receiving the first signal, at the same time the first timer is capable of stopping counting time; wherein the controller is also capable of dividing a value of a first count time of the first timer by two to get a value of a first delay time, adding the value of the first delay time to the value of the first count time of the first timer to get a first sum, and transferring the first sum to the second timer to replace a value of a count time of the second timer; wherein the first delay time is defined as the time of transmitting signals from the controller to the first motor driver.

8. The motor control system as claimed in claim 7, wherein the first motor driver further comprises a first buffer for storing the value of the first sum, the first buffer is capable of regulating the first delay time with the controller.

9. The motor control system as claimed in claim 7, further comprising a second motor driver, wherein the second motor driver comprises a third timer, the controller is also capable of outputting a second signal to the second motor driver to make the first timer start to count for a second time; wherein the second motor driver is capable of returning a second feedback signal from the second motor driver to the controller as receiving the second signal, at the same time the first timer is capable of stopping counting time; wherein the controller is also capable of adding the first delay time to a second delay time to get a third delay time, dividing a value of a second count time of the first timer by two to get a value of the third delay time, adding the value of the third delay time to the value of the second count time of the first timer to get a second sum, and transferring the second sum to the third timer to replace a value of a count time of the third timer; wherein the second delay time is defined as the time of transmitting signals from the first motor driver to the second motor driver, and the third delay time is defined as the time of transmitting signals from the controller to the second motor driver.

* * * * *